United States Patent [19]
Watase

[11] Patent Number: 5,401,549
[45] Date of Patent: Mar. 28, 1995

[54] OPTICAL INFORMATION RECORDING MEDIUM

[75] Inventor: Kenta Watase, Tokyo, Japan

[73] Assignee: Ricoh Company, Ltd., Tokyo, Japan

[21] Appl. No.: 766,006

[22] Filed: Sep. 26, 1991

[30] Foreign Application Priority Data

Oct. 15, 1990 [JP] Japan ................. 2-275927

[51] Int. Cl.⁶ .................................................. B32B 3/00
[52] U.S. Cl. ........................................ 428/64; 428/65;
428/457; 428/913; 430/945; 346/135.1; 347/264
[58] Field of Search ............... 428/64, 65, 457, 913;
430/945; 346/76 L, 135.1

[56] References Cited

U.S. PATENT DOCUMENTS

| | | | |
|---|---|---|---|
| 4,940,618 | 7/1990 | Hamada et al. | 428/64 |
| 4,944,981 | 7/1990 | Oguchi et al. | 428/64 |
| 4,950,520 | 8/1990 | Imai et al. | 428/64 |
| 5,206,063 | 4/1993 | Westerhout | 428/64 |

*Primary Examiner*—Patrick J. Ryan
*Assistant Examiner*—Elizabeth Evans
*Attorney, Agent, or Firm*—Cooper & Dunham

[57] ABSTRACT

An optical information recording medium includes a ROM region in which information has been recorded in the form of pits in a substrate, and from which the recorded information can be reproduced upon application of a laser beam thereto, and a recording region in which information can be recorded in the form of pits from which the recorded information can be reproduced upon application of a laser beam thereto, with the improvement wherein a reflective layer is provided in a ROM region portion of the substrate in the ROM region, and a recording layer is overlaid on both the reflective layer in the ROM region portion and a recording portion of the substrate in the recording region.

6 Claims, 3 Drawing Sheets

स्5,401,549

OPTICAL INFORMATION RECORDING MEDIUM

BACKGROUND OF THE INVENTION

Field of the Invention

The present invention relates to an optical information recording medium provided with both a read-only-memory (ROM) region and a recording region.

Discussion of Background

Conventional recordable type information recording media, in which information can be recorded by application of a laser beam thereto, comprise a recording layer such as a metal layer comprising Te, Bi or Mn, or a dye layer comprising a cyanine dye, a melocyanine dye or a phthalocyanine dye. Information is recorded in such recording media by the deformation, sublimation or evaporation of the recording layer, or by changing the properties of the recording layer, with application of a laser beam thereto.

On the other hand, conventional ROM type optical information recording media, in which information has been recorded, and no additional data can be recorded afterwards or the recorded information cannot be erased, comprise (i) a substrate made of, for example, polycarbonate, in which pits or pregrooves for reproducing recorded information have been formed by a pressing process, (ii) a reflective layer such as a metal layer made of Au, Ag, Cu, Al or the like, which is provided on the substrate, and (iii) a protective layer provided on the reflective layer. Representative examples of such ROM type optical information recording media are compact disks.

The ROM type optical information recording media with an identical information or data recorded therein can be mass produced, and there is no risk that the recorded information or data is erased by mistake. However, the user cannot additionally record his or her desired information in the recording medium.

On the other hand, in the recordable type optical information recording media, the user can record information as desired, but there is the risk that the recorded information is erased by mistake. Furthermore, the recordable type optical information recording media are not suitable for mass producing recording media with an identical information being recorded.

Because of these respective advantages and disadvantages of the two types of optical information recording media and the respective limited application fields thereof, an optical information recording medium 11 including both a ROM region 12 and a recording region 13 as shown in FIG. 4 has been proposed and disclosed in Japanese Laid-Open Patent Application 2-42652. The optical information recording medium 11 can be obtained by coating a recording layer 15, in the recording region 13, on a substrate 14 on which a pit 18 or a pregroove 19 has been formed, providing a reflective layer 16 such as a metallic layer so as to cover both the ROM region 12 and the recording layer 15 in the recording region 13, and finally providing a protective layer 17 on the reflective layer 16 in its entirety as shown in FIG. 4.

However, in the method of producing the above recording medium, the recording layer 15 is first formed by spin coating in the recording region 13 of the substrate 14. If the viscosity of the coating liquid for the formation of the recording layer 15 is decreased to make the thickness of the recording layer 15 uniform, the coating liquid for the recording layer 15 enters the ROM region 12. The result is that the boundary between the ROM region 12 and the recording region 13 does not become concentric.

In order to prevent such a problem, a method of shielding the ROM region 12 with a shielding plate (not shown) has been proposed. However, when the viscosity of the coating liquid is low, the coating liquid enters between the shielding plate and the substrate 14 and when the spin coating method is employed, the coating liquid particles collide with the shielding plate and then return onto the recording layer 15. As a result, the thickness of the recording layer 15 is slightly changed from place to place, so that a recording layer with a uniform thickness cannot be obtained. When the recording layer 15 does not have a uniform thickness, the laser beams reflected by the recording layer 15 are made non-uniform so that the recording characteristics of the recording medium, such as the servo performance including tracking performance and focusing performance, are impaired.

Furthermore, when the above-mentioned shielding plate is employed, the contact of the shielding plate with the substrate 14, or the gap between the shielding plate and the substrate 14 must be precisely controlled in order to prevent the substrate 14 from being scratched by the shielding plate. In addition, the utmost care must be taken to prevent the shielding plate from being scratched or smeared.

When a plurality of such ROM regions and recording regions is to be provided, it is extremely difficult to provide the recording layer 15 by using such shielding plates.

SUMMARY OF THE INVENTION

Accordingly, an object of the present invention is to provide an optical information recording medium including both a ROM region and a recording region, which can be fabricated with ease without the necessity for any particular devices between the ROM region and the recording region.

This object of the present invention can be attained by an optical information recording medium comprising a ROM region in which information has been recorded in the form of pits in a substrate, and from which the recorded information can be reproduced upon application of a laser beam thereto, and a recording region in which information can be recorded in the form of pits from which the recorded information can be reproduced upon application of a laser beam thereto, wherein a reflective layer is provided on a ROM region portion of the substrate in the ROM region, and a recording layer is overlaid on both the reflective layer in the ROM region portion and a recording portion of the substrate in the recording region.

In this optical information recording medium, an additional reflective layer may be provided on the recording layer in order to make the light quantity from the ROM region substantially equal to that from the recording region in the course of reproduction of the information recorded in both regions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
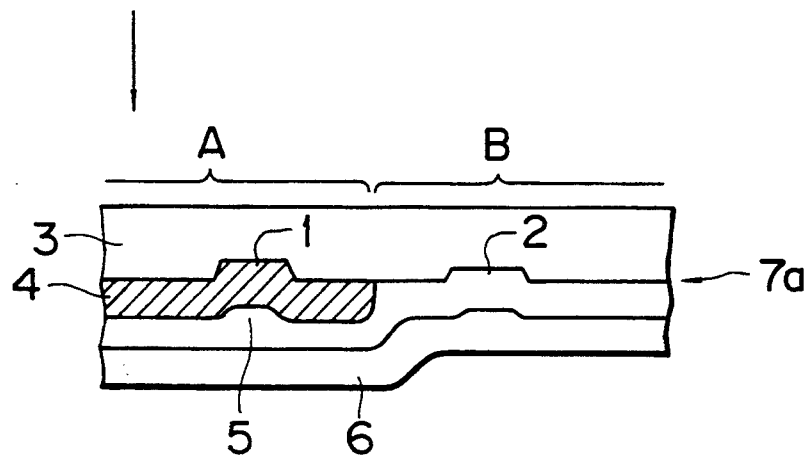
FIG. 1 is a schematic cross-sectional view of an embodiment of an optical information recording medium according to the present invention.

Referring now to the drawings, wherein like reference numerals designate identical or corresponding parts throughout the several views, and more particularly to FIG. 1 which is a schematic cross-sectional view of an embodiment 7a of an optical information recording medium according to the present invention.

In the figure, reference numeral 3 designates a substrate in which a pit 1 for a ROM region A, and a pregroove 2 for a recording region B have been formed. A first reflective layer 4 is provided on the side of the pit 1 in the ROM region A of the substrate 3. The region where the first reflective layer 4 is provided corresponds to the ROM region A, and the remaining region on the substrate 3 in which the pregroove 2 has been formed corresponds to the recording region B.

A recording layer 5 is provided so as to cover both the first reflective layer 4 in the ROM region A and the remaining portion of the substrate in the recording region B by vacuum deposition, sputtering or coating.

A protective layer 6 is further provided on the recording layer 5. The protective layer 6 is for protecting the first reflective layer 4 and the recording layer 5 from external pressure or mechanical shocks, but is not an indispensable component in the present invention. If necessary, an intermediate layer may be interposed between these layers to protect the layers from oxidation or to improve the adhesion between the layers.

The first reflective layer 4 can be made of a single layer comprising a metal such as Au, Cu or Al.

When the recording medium is of an erasable type, the recording layer 5 is of a multi-layer type, comprising a dielectric layer comprising, for instance, SiO, and a magnetic layer comprising, for instance, an alloy such as TbFe or TbeFeCo.

On the other hand, when the recording medium is of a write-once type, the recording layer 5 comprises a light-absorbing organic dye such as a cyanine dye, a naphthoquinone dye or a phthalocyanine dye, and an additive. The recording layer 5 can be formed by uniformly coating a substrate with a coating liquid with a low viscosity comprising such a light-absorbing organic dye dispersed in a solvent such as acetyl acetone or toluene, with a thickness of about several tens angstroms to several hundreds angstroms.

When information is recorded and the recorded information is reproduced, a laser beam is applied toward the transparent substrate 3 in the direction shown by the arrow in FIG. 1. In the ROM region, the applied laser beam is reflected by the reflective layer 4 in such a fashion so as to correspond to the pit 1 in the region, thereby reproducing the information. In this case, even when the recording layer 5 is provided on the back side of the reflective layer 4, the reproduction of the information in the ROM region is not substantially affected by the recording layer 5.

When a laser beam with an intensity necessary for recording information is applied to the recording region B, the pits which correspond to the information to be recorded and from which the recorded information is to be reproduced are formed in the recording layer 5 in the recording region B. When a laser beam for reproducing the recorded information is applied to the recording region B, the applied laser beam is reflected by the recording layer 5 in such a fashion so as to correspond to the formed pits, thereby reproducing the recorded information.

Figure 2:
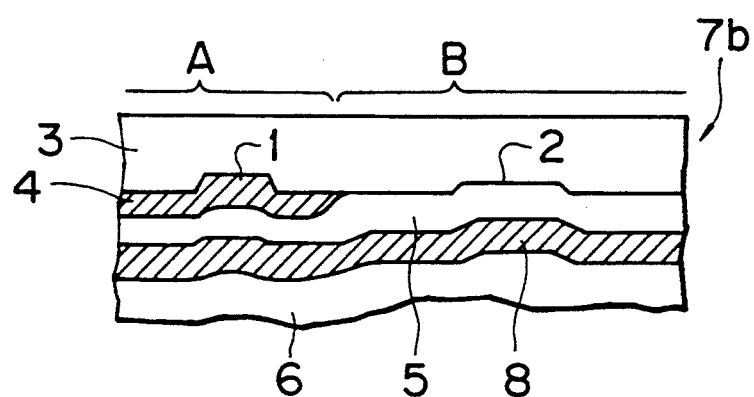
FIG. 2 is a schematic cross-sectional view of another embodiment of an optical information recording medium according to the present invention.

FIG. 2 is a schematic cross-sectional view of another embodiment 7b of an optical information recording medium according to the present invention. This embodiment has the same structure as the embodiment shown in FIG. 1 does except that a second reflective layer 8 is provided on the recording layer 5. By the provision of the second reflective layer 8, the quantity of light reflected by the first reflective layer 4 in the ROM region A is made substantially equal to the quantity of light reflected by the second reflective layer 8 via the recording layer 5 in the recording region B.

Figure 3:
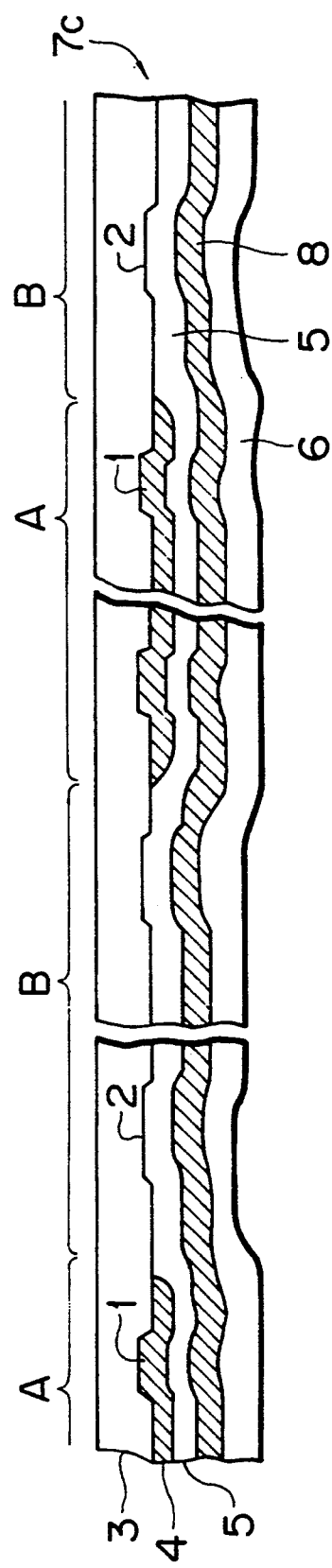
FIG. 3 is a schematic cross-sectional view of a further embodiment of an optical information recording medium according to the present invention.
Figure 4:
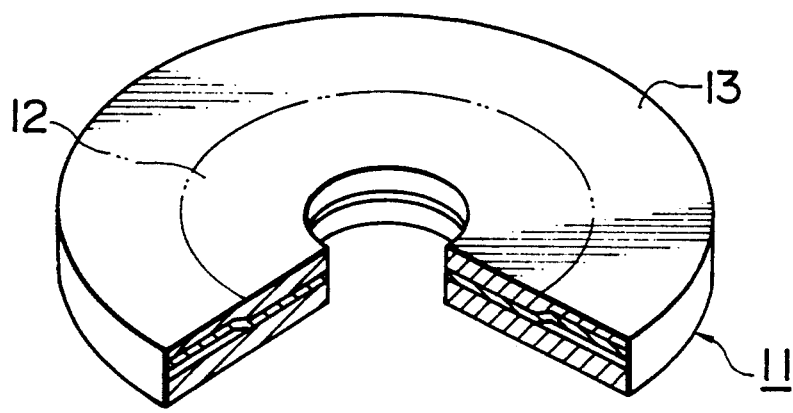
FIG. 4 is a perspective view of a conventional optical information recording medium.
Figure 5:
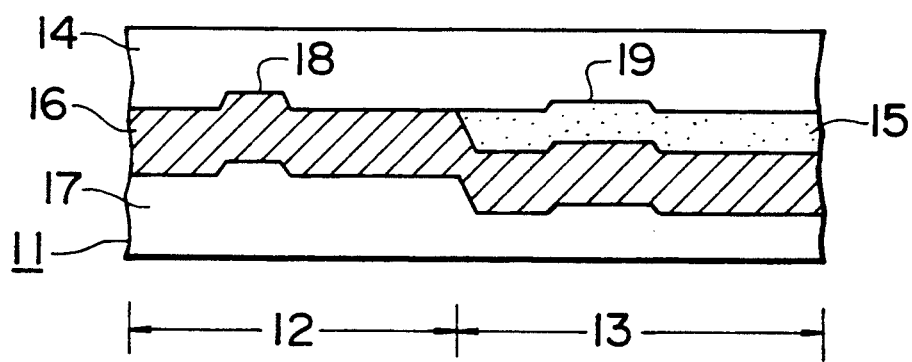
FIG. 5 is a schematic cross-sectional view of the conventional optical information recording medium shown in FIG. 4.

FIG. 3 is a schematic cross-sectional view of a further embodiment 7c of an optical information recording medium according to the present invention. In this embodiment, there are a plurality of ROM regions A and recording regions B. In each ROM region A, the first reflective layer 4 is provided on the substrate 3 including the pit 1, and the recording layer 5 covers the first reflective layer 4 and extends onto the remaining portion of the substrate 3 including the pregroove 2 in the recording region B. Furthermore, the second reflective layer 8 covers the recording layer 5. When necessary, a protective layer 6 may be provided on the second reflective layer 8. In such a structure, no devices are necessary for separating the first reflective layer 4 in the ROM region A and the recording layer 5 in the recording region B particularly when forming the recording layer 5 so that the fabrication of the recording medium is quite simple.

Thus, according to the present invention, after the first reflective layer 4 has been formed on the substrate 3, the recording layer 5 is overlaid on the first reflective layer 4 and on the remaining portion of the substrate 3. Therefore no particular devices are necessary for separating the first reflective layer 4 and the recording layer 5 during the formation of the recording layer 5, so that the fabrication of the recording medium is simple and free from the problem that the thickness of the recording layer 5 becomes uneven because of the scattering of the components for the recording layer 5 back to the recording region as in the conventional recording media. Therefore, an optical recording medium with stable recording and reproduction performance can be obtained by the present invention.

As mentioned previously, in the present invention, the recording layer 5 also covers the first reflective layer 4. However, the quantity of the light reflected by the boundary region between the first reflective layer 4 and the recording layer 5 is less than several percent of the quantity of the light reflected by the boundary region between the substrate 3 and the first reflective layer 4. Therefore the provision of the recording layer 5 on the back side of the first reflective layer 4 has substantially no effect on the reproducing performance in the ROM region.

Further, according to the present invention, even when a plurality of the ROM regions and the recording regions is formed and these regions are narrow, the fabrication is not difficult at all.

Furthermore, according to the present invention, when the second reflective layer 8 is provided as in the second embodiment of the present invention, the quantity of light reflected by the first reflective layer 4 in the ROM region A is made substantially equal to the quantity of light reflected via the recording layer 5 in the recording region B by the second reflective layer 8, so that stable reproduction can be achieved equally in both the ROM region A and the recording region B.

What is claimed is:

1. In an optical information recording medium of an erasable type comprising a ROM region in which information has been recorded in the form of pits in a substrate, and from which the recorded information can be reproduced upon application of a laser beam thereto, and a recording region in which information can be recorded in the form of pits from which the recorded information can be reproduced upon application of a laser beam thereto, the improvement wherein a reflective layer is provided in a ROM region portion of said substrate in said ROM region, and a recording layer is overlaid on both said reflective layer in said ROM region portion and a recording portion of the substrate in said recording region, said recording layer being of a multi-layer type comprising a dielectric layer and a magnetic layer.

2. The optical information recording medium as claimed in claim 1, further comprising an additional reflective layer which is overlaid on said recording layer.

3. The optical information recording medium as claimed in claim 2, further comprising a protective layer which is overlaid on said additional reflective layer.

4. The optical information recording medium as claimed in claim 1, further comprising a protective layer which is overlaid on said recording layer.

5. The optical information recording medium as claimed in claim 1, wherein said dielectric layer comprises SiO.

6. The optical information recording medium as claimed in claim 1, wherein said magnetic layer comprises an alloy selected from the group consisting of TbFe and TbFeCo.

* * * * *